(12) United States Patent
Hashirayama

(10) Patent No.: US 6,217,012 B1
(45) Date of Patent: Apr. 17, 2001

(54) SPRING SEAT FIXING STRUCTURE FOR A HYDRAULIC SHOCK ABSORBER

(75) Inventor: Kenji Hashirayama, Saitama (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 09/301,528

(22) Filed: Apr. 28, 1999

(30) Foreign Application Priority Data

Jul. 24, 1998 (JP) .................................................. 10-223773

(51) Int. Cl.⁷ ............................... F16F 9/32; B60G 15/06
(52) U.S. Cl. ............... 267/221; 188/322.19; 188/322.17; 267/33; 267/286
(58) Field of Search .......................... 267/221, 286–291, 267/166, 170, 179, 177, 33, 226, 64.15, 220, 218, 178; 188/322.19, 321.11, 322.17; 280/124.151, 124.155, 276, 124.147, 124.179

(56) References Cited

U.S. PATENT DOCUMENTS

| | | | |
|---|---|---|---|
| 3,892,397 | * 7/1975 | Nicholls | 267/34 |
| 4,795,010 | * 1/1989 | Kaneko | 188/322.19 |
| 5,328,196 | * 7/1994 | Ohma . | |
| 5,553,713 | * 9/1996 | Sydekum et al. | 267/221 |
| 5,620,172 | * 4/1997 | Fulks et al. | 267/221 |
| 5,961,106 | * 10/1999 | Shaffer | 267/221 |
| 6,076,814 | * 6/2000 | Grundei | 267/221 |

FOREIGN PATENT DOCUMENTS

| | | |
|---|---|---|
| 19506699 | * 4/1996 | (DE) . |
| 974476 | * 1/2000 | (EP) . |
| 55-12608 | 3/1980 | (JP) . |

* cited by examiner

Primary Examiner—Douglas C. Butler
(74) Attorney, Agent, or Firm—Orum & Roth

(57) ABSTRACT

In a spring seat fixing structure of a hydraulic shock absorber (10), a proximal end side of a cap (44) is provided with a small diameter force-fit portion (71) which is fixedly forced into a small outer diameter portion (51) of a damper tube (11), and a distal end side of the cap (44) is provided with a large diameter force-fit portion (73) which is fixedly forced into a large outer diameter portion (52) of the damper tube (11).

18 Claims, 6 Drawing Sheets

SPRING SEAT FIXING STRUCTURE FOR A HYDRAULIC SHOCK ABSORBER

BACKGROUND OF THE INVENTION

1. Field of the Invention

The present invention relates to a spring seat fixing structure for a hydraulic shock absorber.

2. Description of the Related Art

Conventionally, a hydraulic shock absorber having a damper tube and a suspension spring has been proposed as disclosed in Examined Utility Model Publication (Kokoku) No. 55-12608. The hydraulic shock absorber is constructed in a manner that a cap is fixedly forced (pressed in) into a periphery of a shaft seal part of the damper tube, and a spring seat for the suspension spring is located on an outer periphery on a distal end side of the cap.

In the aforesaid hydraulic shock absorber, in the case of providing a suspension spring having a desired length along an axial direction around the damper tube, a spring seat for the suspension spring must be located on a distal end side separated from the shaft seal part of the damper tube in the axial direction. Further, in order to retain the spring seat onto the damper tube without a misalignment, it is preferable that the cap is fixedly forced into the damper tube up to a location nearest to a spring seat mounting portion on the distal end side of the cap. Therefore, the cap needs to be fixedly forced into the damper tube by a considerably long range up to a location nearest to the spring seat mounting portion considerably separated from the shaft seal part of the damper tube in the axial direction.

However, in the aforesaid prior art, an outer diameter of the damper tube is formed in a straight line. In the case where a considerably long portion from a proximal end side to the distal end side of the cap is used as a force-fit portion, in a process for fixedly forcing a force-fit portion on the distal end side of the cap into an outer diameter portion of the damper tube, a long portion of the damper tube is used as a force-fit surface. For this reason, it is difficult to force the cap into the damper tube.

SUMMARY OF THE INVENTION

An object of the present invention is to provide a spring seat mounting portion in a cap which is fixedly forced into a periphery of a shaft seal part of a damper tube, and to stably provide a spring seat without misalignment when mounting the spring seat onto a distal end side of the cap separated from the shaft seal part of the damper tube in the axial direction, and thus, to readily force the cap into the damper tube.

To achieve the above object, the present invention provides a spring seat fixing structure for a hydraulic shock absorber which has a damper tube and a suspension spring, and is constructed in a manner such that a cap is fixedly forced into a periphery of a shaft seal part of the damper tube, and an outer periphery on a distal end portion of the cap is provided with a spring seat, wherein the damper tube has a small outer diameter portion around the shaft seal part and a large outer diameter portion on a side separated from the shaft seal part in an axial direction. A proximal end side of the cap is provided with a small diameter force-fit portion which is fixedly forced into the small outer diameter portion of the damper tube, and a distal end side of the cap is provided with a large diameter force-fit portion which is fixedly forced into the large outer diameter portion of the damper tube.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings.

DESCRIPTION OF THE PREFERRED EMBODIMENTS

Figure 1:
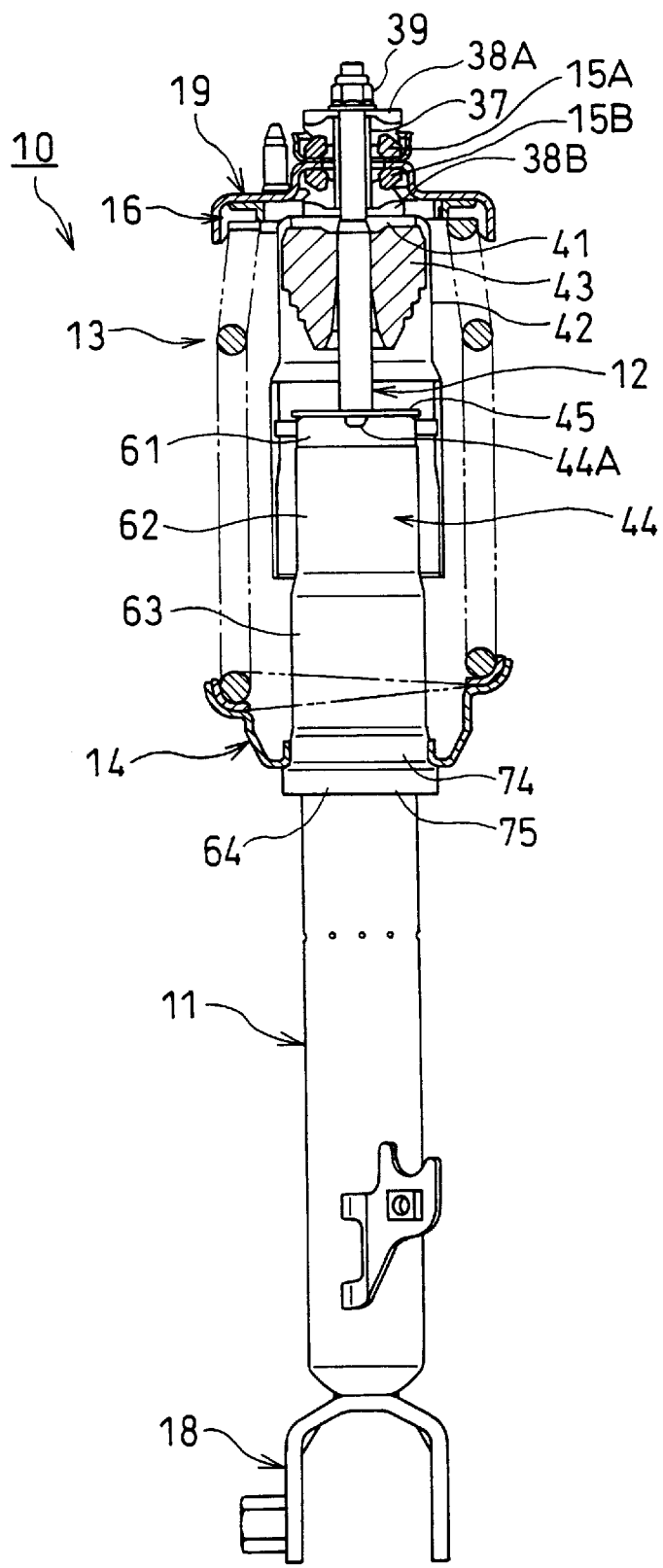
FIG. 1 is a schematic view showing one example of a hydraulic shock absorber according to the present invention.
Figure 2:
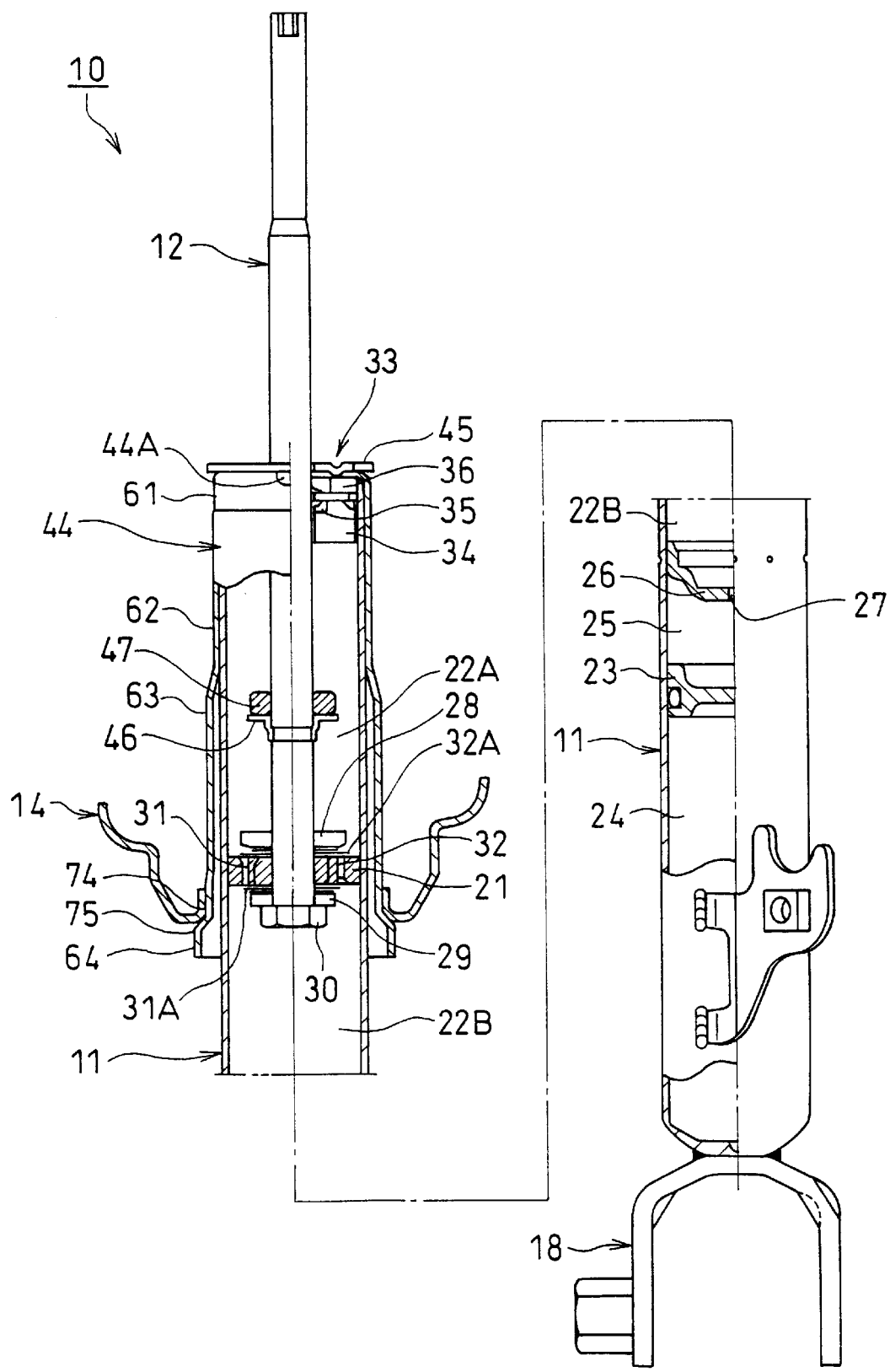
FIG. 2 is a cross sectional view showing principal parts of the hydraulic shock absorber shown in FIG. 1.

As shown in FIG. 1, hydraulic shock absorber 10 is a single tube separate pressure type, and has a damper tube 11, a piston rod 12 and a suspension spring 13. A lower spring seat 14 is mounted to an outer periphery of the damper tube 11 as described later in detail. An upper spring seat 16 is mounted to the piston rod 12. The suspension spring 13 is stretched between the lower spring seat 14 and the upper spring seat 16.

The hydraulic shock absorber 10 includes an axle side mounting part 18 at a lower portion of the damper tube 11, and a vehicle body side mounting part 19 at the upper spring seat 16 mounted to the piston rod 12. The suspension spring 13 absorbs an impact from a road surface, and then, a damper included in the damper tube 11 damps a vibration by elongation and compression of the suspension spring 13.

In the hydraulic shock absorber 10, a working fluid is filled in the damper tube 11, and a piston 21 is arranged so as to be slidable. The piston 21 partitions an interior of the damper tube 11 so as to form a rod side chamber 22A which is filled with a working fluid and receives the piston rod 12, and a piston side chamber 22B which is filled with a working fluid and does not receive the piston rod 12.

As described above, the hydraulic shock absorber 10 is a single tube separate pressure type. A free piston 23 is slidably located in the damper tube 11, and the damper tube 11 is partitioned into a pressure gas chamber 24 and a reservoir chamber 25 by means of the free piston 23. A free piston stopper 26 is fastened and fixed between the reservoir chamber 25 and the piston side chamber 22B. The piston side chamber 22B and the reservoir chamber 25 communicate with each other via an orifice 27 of the stopper 26. The reservoir chamber 25 compensates a working fluid corresponding to a volumetric change by the piston rod 12 which advances into or retreats from the damper tube 11 during a compression stroke and an elongation stroke of the hydraulic shock absorber 10.

In the hydraulic shock absorber 10, a valve stopper 28, a piston 21 and a valve stopper 29 are fixed onto an insert end of the piston rod 12 into the damper tube 11 by means of a nut 30. The piston 12 having an elongation side damping valve 31A and a compression damping valve 32A, includes an elongation side channel 31 which is capable of connecting the rod side chamber 22A and the piston side chamber 22B, and a compression side channel 32 which is capable of connecting the rod side chamber 22A and the piston side chamber 22B. By doing so, in an elongation stroke of the hydraulic shock absorber 10, the working fluid of the rod side chamber 22A passes through the elongation side channel 31 of the piston 21, and then elastically deforms the elongation side damping valve 31A so as to generate an elongation side damping force, and thus, flows into the piston side chamber 22B. On the other hand, in a compression stroke of the hydraulic shock absorber 10, the working fluid of the rod side chamber 22B passes through the compression side channel 32 of the piston 21, and then elastically deforms the elongation side damping valve 32A so as to generate a compression side damping force, and thus, flows into the piston side chamber 22A In the hydraulic shock absorber 10, a rod guide 34 is fastened and fixed at one end of a shaft seal part 33 of the damper tube 11, and the piston rod 12 penetrates through the rod guide 34 so as to be supported thereto. The shaft seal part 33 includes an oil seal 35. Further, the shaft seal part 33 is subjected to bending (fastening) so as to retain an end plate 36 located outside of the oil seal 35 (see FIG. 3).

In the hydraulic shock absorber 10, pads 38A and 38B are positioned on an outermost end portion of the piston rod 12 by means of a joint collar 37, and mounting buffers 15A and 15B are interposed between pads 38A and 38B. A mounting nut 39 is screwed onto an upper end portion of the piston rod 12 in order to hold the aforesaid vehicle body side mounting part 19 between the mounting buffers 15A and 15B, and thus, the upper end portion of the piston rod 12 is elastically mounted to the vehicle body side mounting part 19. Also, the vehicle body side mounting part 19 is provided with the aforesaid upper spring seat 16.

In the hydraulic shock absorber 10, a cover 42 is fixed at the outer end portion of the piston rod 12 and between a pad stopper 41 for supporting the pad 38B to the piston rod 12 and the pad 38B. The cover 42 extends up to the upper end portion of the damper tube 11, and is arranged so as to surround a rubber bumper 43, which is backed up by the pad stopper 41 around the piston rod 12.

In the hydraulic shock absorber 10, a proximal end portion of a bump stopper cap 44 is fixedly forced into a periphery of the aforesaid shaft seal part 33 of the damper tube 11, and the aforesaid lower spring seat 14 is provided at an outer periphery on the distal end side of the cap 44. A proximal surface of the cap 44 is provided with a rubber bumper abutting plate 45. When the hydraulic shock absorber 10 is compressed to the maximum, the aforesaid rubber bumper 43 is abutted against the abutting plate 45, and then, is compressively deformed so as to restrict the maximum compression stroke. The aforesaid cover 42 restricts an expansive deformation of the rubber bumper 43 by its compression during the maximum compression, and thus, sets a spring characteristic when the hydraulic shock absorber 10 is compressed to the maximum.

In the hydraulic shock absorber 10, a rebound rubber 47 backed up and supported onto a rebound stopper 46 is provided at a periphery of the piston rod 12 situated in the rod side chamber 22A of the damper tube 11. When the hydraulic shock absorber 10 is elongated to the maximum, the rebound rubber 47 is abutted against the aforesaid rod guide 34 so as to restrict the maximum elongation stroke.

As described above, in the hydraulic shock absorber 10, in the case where the spring seat 14 for the suspension spring 13 is provided on the outer periphery of the damper tube 11, the bump stopper cap 44 is fixedly forced around the shaft seal part 33 of the damper tube 11, and the spring seat 14 is provided on the outer periphery on the distal end side of the cap 44. The following is a detailed description on a fixing structure of the spring seat 14.

Figure 3:
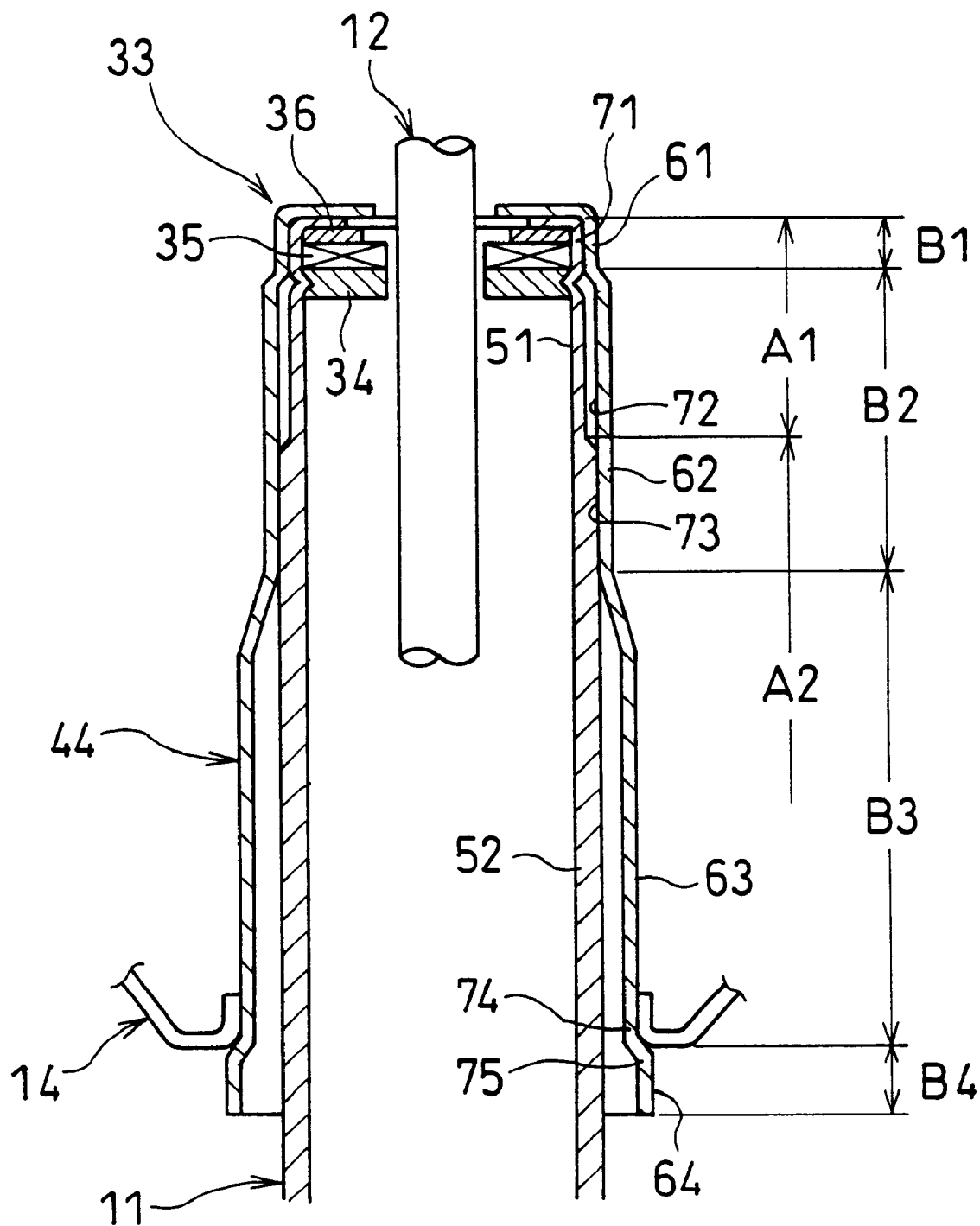
FIG. 3 is an enlarged view showing principal parts shown in FIG. 2.
Figure 4:
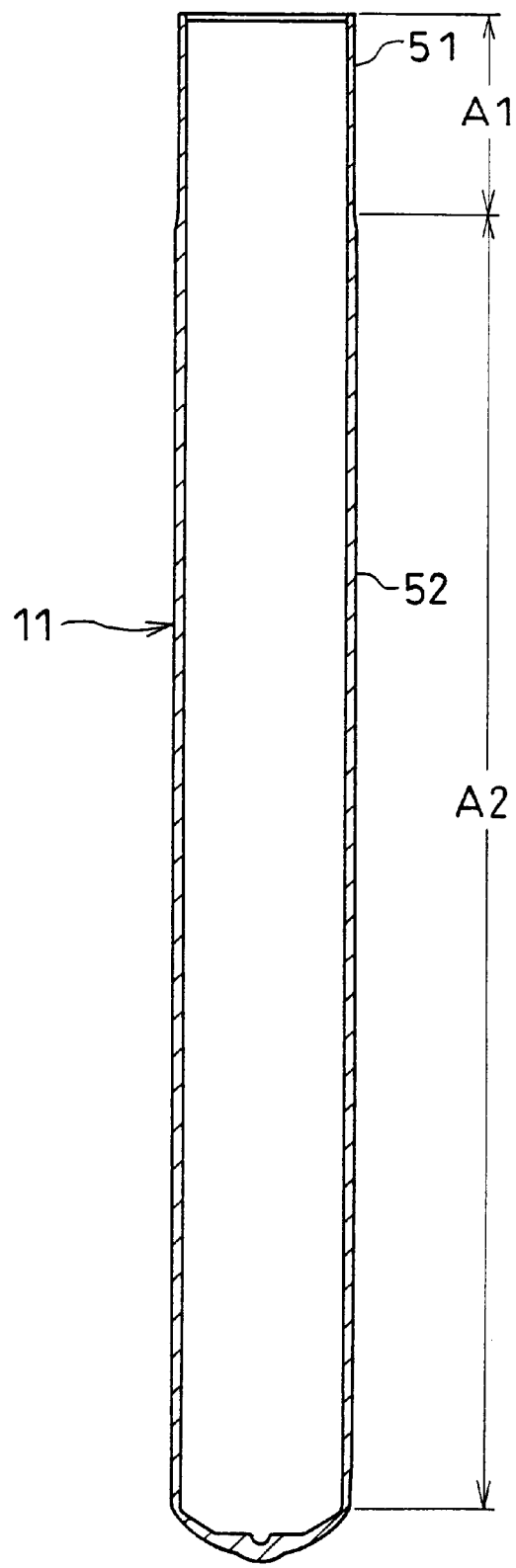
FIG. 4 is a schematic view showing a damper tube.

As shown in FIG. 3 and FIG. 4, in the hydraulic shock absorber 10, the damper tube 11 has the following outer diameter portions, that is, a small outer diameter portion 51 (a range shown by a length A1) around the shaft seal part 33, and a large outer diameter portion 52 (a range shown by a length A2 excluding the length A1 from the entire length of damper tube 11 in this embodiment) on a side separated from the shaft seal part 33 in the axial direction. The small outer diameter portion 51 is made smaller than the large outer diameter portion 52 by being subjected to cutting or drawing or the like.

Figure 5A:
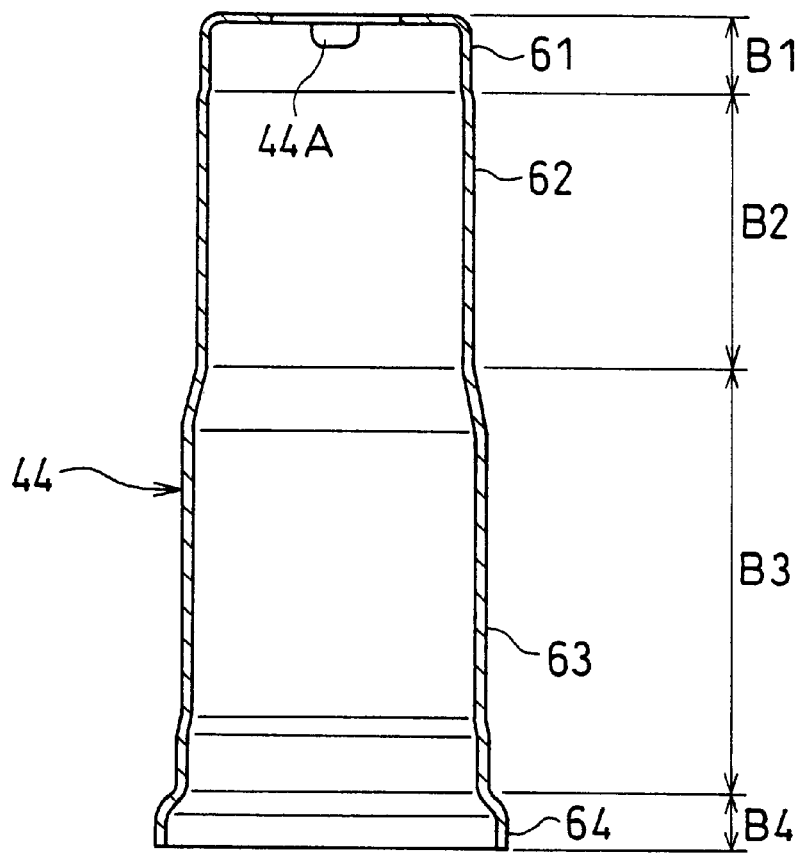
FIG. 5A and FIG. 5B are schematic views showing a cap.

Further, in the hydraulic shock absorber 10, as shown in FIG. 3 and FIG. 5A, the cap 44 has the following inner diameter portions enlarged successively from the proximal end side to the distal end side, that is, a small inner diameter portion 61 (a range shown by a length B1), a large inner diameter portion 62 (a range shown by a length B2), a first enlarged diameter portion 63 (a range shown by a length B3), and a second enlarged diameter portion 64 (a range shown by a length B4). Also, a predetermined taper portion is formed at each boundary portion of the small inner diameter portion 61, large inner diameter portion 62, first enlarged diameter portion 63 and second enlarged diameter portion 64, which are adjacent to each other.

Further, the hydraulic shock absorber 10 has a small diameter force-fit portion 71 formed in a manner that the small inner diameter portion 61 on the proximal end side of the cap 44 is fixedly forced into the small outer diameter portion 51 of the damper tube 11, a non-force fit portion 72 which is a part of the large inner diameter portion 62 of the cap 44 and is a portion corresponding to the small outer diameter portion 51 of the damper tube 11, and a large diameter force-fit portion 73 formed in a manner that the other part of the large inner diameter portion 62 of the cap 44 is fixedly forced into the large outer diameter portion 52 of the damper tube 11.

Furthermore, the hydraulic shock absorber 10 has a spring seat mounting portion 74 formed in a manner that the first enlarged diameter portion 63 on the proximal end portion counter to the large diameter force-fit portion 73 of the cap 44 is enlarged more than the large outer diameter portion 52 of the damper tube 11. The spring seat 14 is fixedly forced into a periphery on the distal end of the spring seat mounting portion 74. Also, in the cap 44, the second enlarged diameter portion 64 extending from the first enlarged diameter portion 63 functions as a seat retainer portion 75 which is additionally included in the spring seat mounting portion 74.

Figure 5B:
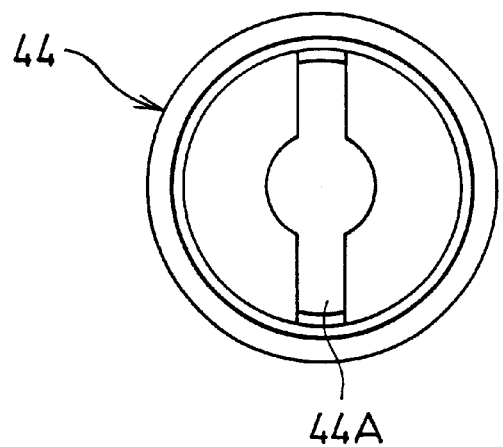

Moreover, the proximal end surface of the cap 44 is formed with an air vent hole 44A when the rubber bumper 43 is abutted against the abutting plate 45 (see FIG. 5A and FIG. 5B).

The hydraulic shock absorber 10 obtains a sub-assembled state such that the spring seat 14 is fixedly forced into the spring seat mounting portion 74 so as to prevent it from coming off from the seat retainer portion 75 of the cap 44. Thereafter, the cap 44 is forced from the small outer diameter portion 51 around the shaft seal part 33 of the damper tube 11 toward the large outer diameter portion 52 so that the small diameter force-fit portion 71 of the cap 44 is fixed onto the small outer diameter portion 51 of the damper tube 11 and the outer diameter force-fit portion 73 of the cap 44 is fixed onto the large outer diameter portion 52 of the damper tube 11. At this time, the outer diameter force-fit portion 73 of the cap 44 is loosely inserted without resistance until the distal end portion of the large inner diameter portion 62 passes through the small outer diameter portion 51 having a length A1 of the damper tube 11. Thereafter, the outer diameter force-fit portion 73 of the cap 44 is scarcely started to be forced before reaching the large outer diameter portion 52 of the damper tube 11, so that the force-fit margin can be shortened. Further, a forced range of the cap 44 with respect to the damper tube 11, that is, the total length (B1+B2) of the small inner diameter portion 61 and the large inner diameter portion 62 is set longer in order to stably support the long suspension spring 13 without causing misalignment. In such a case, the force-fit margin in the small diameter force-fit portion 71 and the large diameter force-fit portion 73 of the cap 44 can be also shortened because the non-force fit portion 72 exists.

Therefore, the following effects (operations) are obtained according to this embodiment.

(1) The cap 44, which is fixedly forced around the shaft seal part 33 of the damper tube 11, is provided with the spring seat mounting portion 74, and the spring seat 14 is provided on the distal end side separated from the shaft seal part 33 of the damper tube 11 in the axial direction. In this case, the small diameter force-fit portion 71 on the proximal end side of the cap 44 is fixedly forced into the small outer diameter portion 51 of the damper tube 11 while the large diameter force-fit portion 73 on the distal end side of the cap 44 is fixedly forced into the large outer diameter portion 52 of the damper tube 11. Therefore, in the case of providing the spring seat 14 on the distal end side of the cap 44, the large diameter force-fit portion 73 on the distal end side of the cap 44 is fixedly forced into the damper tube 11, so that the spring seat 14 can be stably retained without misalignment. Further, the large diameter force-fit portion 73 on the distal end side of the cap 44 is loosely inserted into the small outer diameter portion 51 around the shaft seal part 33 of the damper tube 11, and then, is scarcely started to be forced before reaching the large outer diameter portion 52 thereof. Thus, the force-fit margin is short, and it is possible to readily force the cap into the damper tube.

(2) The cap 44 has the non-force fit portion 72 between the small diameter force-fit portion 71 and the large diameter force-fit portion 73. The suspension spring 13 is long; and for this reason, the large diameter force-fit portion 73, where the spring seat mounting portion 74 of the cap 44 is located, is fixedly forced at a position which is a relatively large distance from the shaft seal part 33 of the damper tube 11. In this case, therefore, a force-fit margin of the large diameter force-fit portion 73 is further shortened by a length corresponding to the non-force fit portion 72, and is shortened more than the force-fit margin of the small diameter force-fit portion 71, and thus, it is possible to readily force the cap into the damper tube.

(3) The spring seat mounting portion 74 of the cap 44 is enlarged in its diameter more than the outer diameter of the damper tube 11 so as not to contact the damper tube 11. Therefore, even if the inner diameter of the spring seat mounting portion 74 of the cap 44 is deformed by mounting the spring seat 14, the deformed portion of the spring seat mounting portion 74 does not damage the damper tube 11, and there is no change (deformation) in the circular cross-sectional shape of the damper tube 11. Therefore, there would be no effect on the sliding motion of the piston 21 and other pistons in the damper tube 11.

(4) The spring seat mounting portion 74 of the cap 44 is additionally provided with the seat retainer portion 75 which is enlarged in its diameter more than the mounting inner diameter of the spring seat 14. Therefore, the spring seat 14 can be securely prevented from coming off from the spring seat mounting portion 74.

Figure 6:
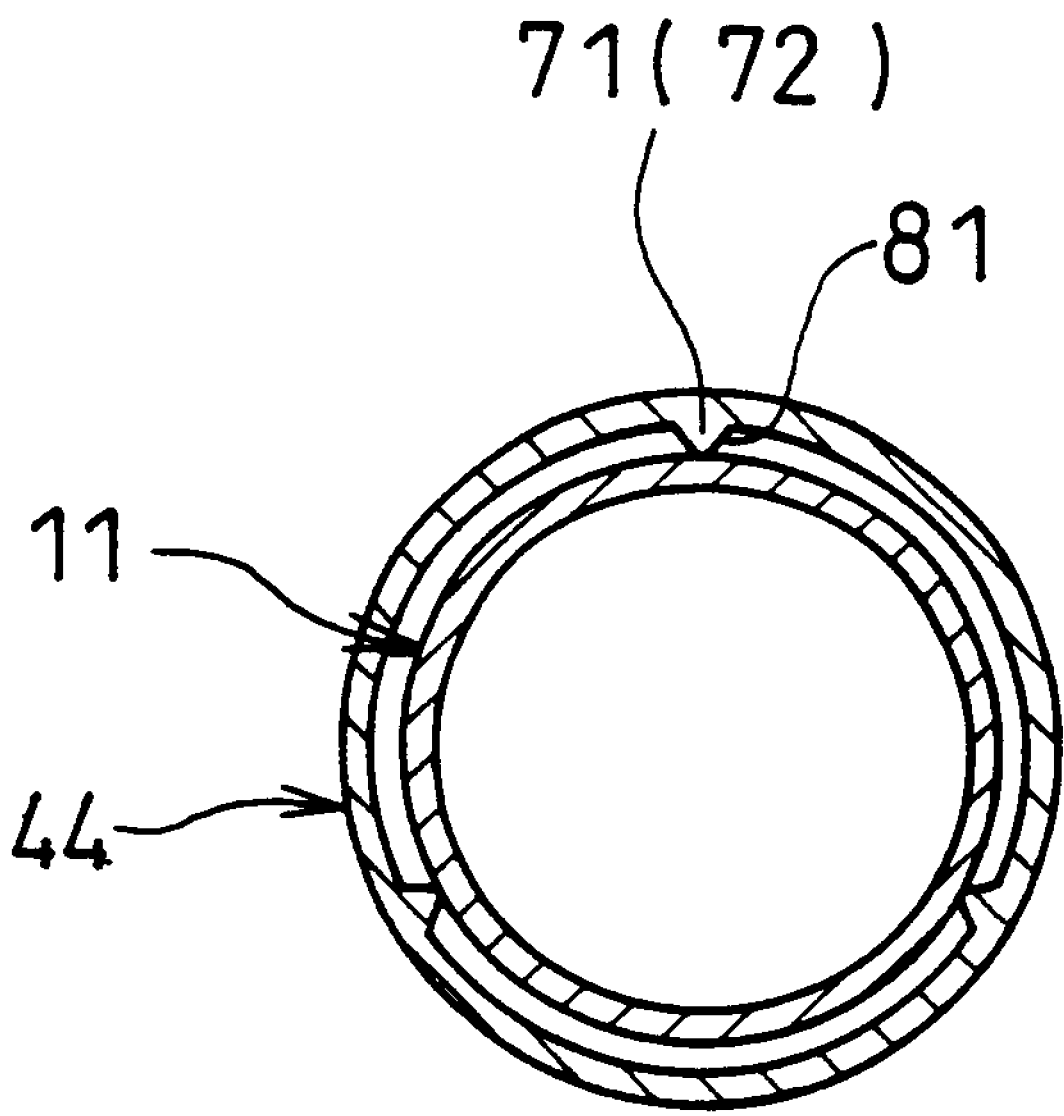
FIG. 6 is a schematic view showing a modification where a cap is pressed into the damper tube.

In this embodiment, as shown in FIG. 6, the small diameter force-fit portion 71 and/or the large diameter force-fit portion 73 of the cap 44 are/is provided with a plurality of protrusions 81 which extend in the axial direction along the circumferential direction of the inner diameter thereof. With the use of the protrusions 81, the cap 44 may be partially forced into the small outer diameter portion 51 and the large outer diameter portion 52 of the damper tube 11. The cap 44 is fixedly forced into the damper tube 11, not in surface contact but in point contact, so that a force-fit load can be reduced.

As described above, the preferred embodiment of the present invention has been described with reference to the accompanying drawings. However, detailed construction of the present invention is not limited to the specific embodiment, and various changes and modifications are possible in design without departing from the sprit and scope of the present invention. For example, in the case of carrying out the present invention, the following modifications may be employed.

(1) It is not essential that the cap should include the non-force fit portion between the small diameter force-fit portion and the large diameter force-fit portion.

(2) Not only may the cap include two force-fit portions, that is, the small diameter force-fit portion and the large diameter force-fit portion with respect to the damper tube, but also the cap may include one or more intermediate diameter force-fit portions between the small diameter force-fit portion and the large diameter force-fit portion. In this case, the damper tube is provided with one or more intermediate outer diameter portions between the small outer diameter portion and the large outer diameter portion. At this time, the small diameter force-fit portion, one or more intermediate force-fit portions and the large diameter force-fit portion (the small outer diameter portion, the intermediate outer diameter portion and the large outer diameter portion) are successively enlarged in their force-fit diameter (outer diameter).

(3) No limitation is set such that the spring seat is fixedly forced into the spring seat mounting portion of the cap, and the spring seat may be fixed thereto by other fixing means such as welding or the like. Further, the spring seat may be molded integrally with the cap.

As is evident from the above description, according to the present invention, the cap, which is fixedly forced around the shaft seal part of the damper tube, is provided with the spring seat mounting portion, and the spring seat is provided on the distal end side separated from the shaft seal part of the damper tube in the axial direction. Therefore, the spring seat can be stably mounted onto the cap without misalignment, and it is possible to readily force the cap into the damper tube.

While the preferred embodiments of the invention have been described in detail with reference to the drawings, they are by no means limitative, and various changes and modifications are possible without departing from the scope and spirit of the invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above but should be understood to include all possible embodiments which can be embodied within a scope encompassed by this description and equivalents thereof with respect to the features set out in the appended claims.

What is claimed is:

1. A spring seat fixing structure of a hydraulic shock absorber, comprising a damper tube and a suspension spring, a cap fixedly forced into a periphery of a shaft seal part of said damper tube, and an outer periphery on a distal end portion of said cap provided with a spring seat, said damper tube having a small outer diameter portion around said shaft seal part and a large outer diameter portion on a side separated from said shaft seal part in an axial direction, wherein a proximal end side of said cap is provided with a small diameter force-fit portion which is fixedly forced onto said small outer diameter portion of said damper tube, and a distal end side of said cap is provided with a large diameter force-fit portion which is fixedly forced onto said large outer diameter portion of said damper tube.

2. The spring seat fixing structure of a hydraulic shock absorber according to claim 1, wherein said cap includes a non-force fit portion between said small diameter force-fit portion and said large diameter force-fit portion.

3. The spring seat fixing structure of a hydraulic shock absorber according to claim 2, wherein said cap has a spring seat mounting portion which is enlarged in its diameter more than an outer diameter of said damper tube, at a proximal end side counter to said large diameter force-fit portion.

4. The spring seat fixing structure of a hydraulic shock absorber according to claim 3, wherein said spring seat mounting portion of said cap additionally includes a spring seat retainer portion, which is enlarged in its diameter more than a mounting inner diameter of said spring seat.

5. The spring seat fixing structure of a hydraulic shock absorber according to claim 4, wherein said small diameter force-fit portion and the large diameter force-fit portion of said cap are partially forced at a plurality of positions in a circumferential direction of said damper tube.

6. The spring seat fixing structure of a hydraulic shock absorber according to claim 4, wherein said small diameter force-fit portion or the large diameter force-fit portion of said cap is partially forced at a plurality of positions in a circumferential direction of said damper tube.

7. The spring seat fixing structure of a hydraulic shock absorber according to claim 3, wherein said small diameter force-fit portion and the large diameter force-fit portion of said cap are partially forced at a plurality of positions in a circumferential direction of said damper tube.

8. The spring seat fixing structure of a hydraulic shock absorber according to claim 3, wherein said small diameter force-fit portion or the large diameter force-fit portion of said cap is partially forced at a plurality of positions in a circumferential direction of said damper tube.

9. The spring seat fixing structure of a hydraulic shock absorber according to claim 2, wherein said small diameter force-fit portion and the large diameter force-fit portion of said cap are partially forced at a plurality of positions in a circumferential direction of said damper tube.

10. The spring seat fixing structure of a hydraulic shock absorber according to claim 2, wherein said small diameter force-fit portion or the large diameter force-fit portion of said cap is partially forced at a plurality of positions in a circumferential direction of said damper tube.

11. The spring seat fixing structure of a hydraulic shock absorber according to claim 1, wherein said cap has a spring seat mounting portion which is enlarged in its diameter more than an outer diameter of said damper tube, at a proximal end side counter to said large diameter force-fit portion.

12. The spring seat fixing structure of a hydraulic shock absorber according to claim 11, wherein said spring seat mounting portion of said cap additionally includes a spring seat retainer portion, which is enlarged in its diameter more than a mounting inner diameter of said spring seat.

13. The spring seat fixing structure of a hydraulic shock absorber according to claim 12, wherein said small diameter force-fit portion and the large diameter force-fit portion of said cap are partially forced at a plurality of positions in a circumferential direction of said damper tube.

14. The spring seat fixing structure of a hydraulic shock absorber according to claim 12, wherein said small diameter force-fit portion or the large diameter force-fit portion of said cap is partially forced at a plurality of positions in a circumferential direction of said damper tube.

15. The spring seat fixing structure of a hydraulic shock absorber according to claim 11, wherein said small diameter force-fit portion and the large diameter force-fit portion of said cap are partially forced at a plurality of positions in a circumferential direction of said damper tube.

16. The spring seat fixing structure of a hydraulic shock absorber according to claim 11, wherein said small diameter force-fit portion or the large diameter force-fit portion of said cap is partially forced at a plurality of positions in a circumferential direction of said damper tube.

17. The spring seat fixing structure of a hydraulic shock absorber according to claim 1, wherein said small diameter force-fit portion and the large diameter force-fit portion of said cap are partially forced at a plurality of positions in a circumferential direction of said damper tube.

18. The spring seat fixing structure of a hydraulic shock absorber according to claim 1, wherein said small diameter force-fit portion or the large diameter force-fit portion of said cap is partially forced at a plurality of positions in a circumferential direction of said damper tube.

* * * * *